United States Patent [19]

Hartmann et al.

[11] 3,856,400

[45] Dec. 24, 1974

[54] APPARATUS FOR NO-CONTACT MEASUREMENT HAVING A MULTI-COLORED GRATING

[75] Inventors: Horst Hartmann, Wetzlar; Hans-Werner Stankewitz, Steindorf, both of Germany

[73] Assignee: Ernst Leitz GmbH, Wetzlar, Germany

[22] Filed: Feb. 22, 1973

[21] Appl. No.: 334,601

[30] Foreign Application Priority Data

Mar. 6, 1972 Germany.......................... 2210681

[52] U.S. Cl. ......... 356/28, 250/237 G, 350/162 SF, 350/317, 356/4, 356/156
[51] Int. Cl. ............................................ G01p 3/36
[58] Field of Search ............. 356/28, 156, 167, 169, 356/4; 350/162 SF, 317; 250/237 G

[56] References Cited
UNITED STATES PATENTS

| | | | |
|---|---|---|---|
| 3,410,626 | 11/1968 | Magrath.............................. | 350/317 |
| 3,533,702 | 10/1970 | Hock et al. ......................... | 356/167 |
| 3,674,372 | 7/1972 | Weyrauch ..................... | 350/162 SF |
| 3,719,127 | 3/1973 | Mueller....:..................... | 350/162 SF |

FOREIGN PATENTS OR APPLICATIONS 1,249,302 10/1971 Great Britain....................... 356/28

Primary Examiner—Maynard R. Wilbur
Assistant Examiner—S. C. Buczinski
Attorney, Agent, or Firm—Krafft & Wells

[57] ABSTRACT

Apparatus for the no-contact measurement of the velocity, the path, or the distance of objects without special optical markers with respect to a reference position having the object imaged onto a grating and measurement of the light flux leaving this grating after cooperation with this grating by means of photoelectric elements. The output signals of the photoelectric elements exhibit a frequency component proportional to the velocity of movement. The present invention is an improvement over the prior art wherein a grating (5,25) is located in the imaging beam path, in the proximity of the imaging plane of an objective (4), as a correlator and position frequency filter. The grating is constructed in the form of a support (26) with areal, photoelectrically distinguishable, colored structures (6, 6', 27). These structures, in correspondence with their colors, are disposed alternatingly in side-by-side linewise relationship and the support is followed, via at least one chromatic splitter (8), by preferably two photoelectric receivers (10, 11). The output signals of these receivers are phase-shifted with respect to one another by given amounts based on the physical configuration of the grating.

10 Claims, 5 Drawing Figures

Patented Dec. 24, 1974
3,856,400
2 Sheets-Sheet 1
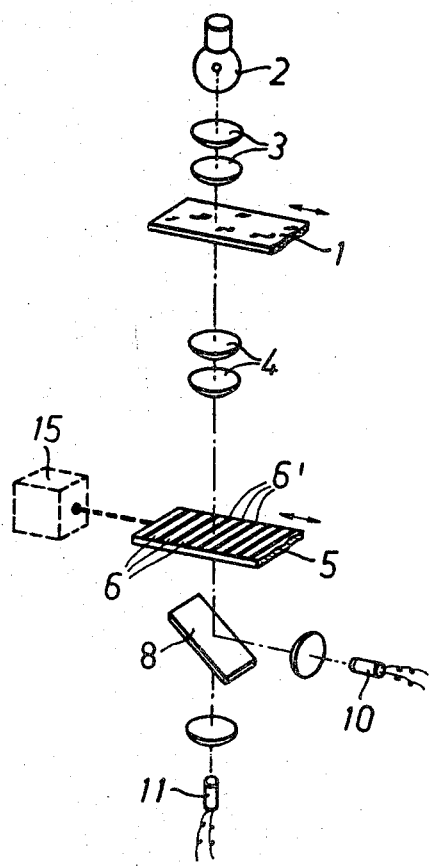
Fig. 1
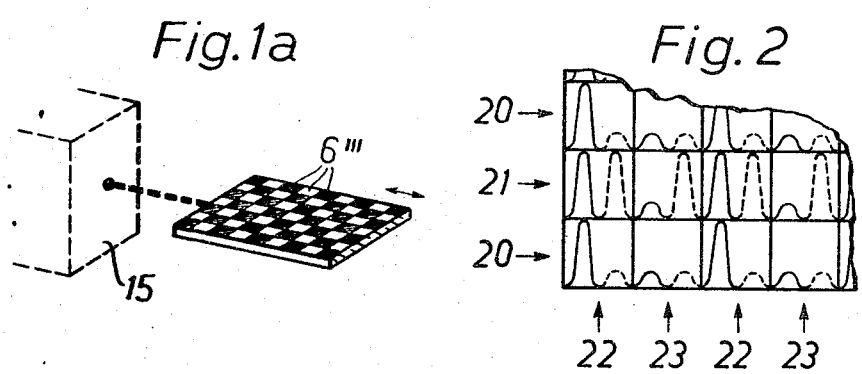
Fig. 1a
Fig. 2

APPARATUS FOR NO-CONTACT MEASUREMENT HAVING A MULTI-COLORED GRATING

CROSS REFERENCES TO RELATED APPLICATIONS

Applicants claim priority under 35 U.S.C. 119 for Application P 22 10 681.6, filed Mar. 6, 1972 in the Patent Office of the Federal Republic of Germany.

The disclosure of U.S. Application Ser. No. 283,967, filed Aug. 28, 1972, of Heitmann et al., and having the same assignee as the present invention is incorporated herein. The application of Heitmann et al discloses the state of the art of apparatus for no-contact measurement and particularly discloses the use of a pyramidal grating, the method for converting the position frequency into a speed proportional time frequency, how the magnitude and direction is determined from the grating movement, the electronic circuitry used, how the magnitude and/or velocity are obtained, and how the push-pull signals are evaluated.

BACKGROUND OF THE INVENTION

The present invention relates to a device for the no-contact measurement of the speed, the path, or the distance of objects without special optical markers with regard to a reference position.

Optical speed measuring devices have been known wherein relative movements of an object with respect to a photoelectric receiver produce measuring variables dependent on the relative velocity. In this connection three different methods are basically employed.

On the one hand, the object to be involved in the measurement is irradiated with a monochromatic coherent radiation; then, the light scattered on the object is collected, the frequency of this light being influenced due to Doppler shift; and then, the frequency of the scattered light is measured by interference with the primary radiation or with light frequency-shifted in the opposite direction. This conventional method requires an expenditure in apparatus which in many cases is intolerable, due to the required laser and interferometers.

On the other hand, the moved object is imaged into an image plane wherein at least two photoelectric scanners are disposed which are offset in the direction of movement. The signal of the first scanner disposed as the first one in the direction of movement is stored for a preselected time $\tau$ in a short-time storage unit and thereafter compared, in a correlator, with the signal delivered by the subsequent, second scanner displaced by the path $c$. In this connection, the storage time $\tau$ is controlled so that the signal of the second scanner is chronologically congruent with the delayed signal of the first scanner. Then, the speed of the object image relative to the scanners is the result, and by means of this result, via the imaging (reproduction) scale, the velocity $v_0$ of the object is obtained as $$v'_0 = c/\tau$$

This conventional method requires, with a controllable storage means and a correlator, a complicated, trouble-prone expenditure in apparatus and merely yields a median velocity averaged over the storage time $\tau$.

Finally, the moving object is imaged on a grating having a number of lines $k$ per mm. Behind this grating a photoelectric receiver receives the light emanating from the object and, preferably upon the presence of a specific position frequency in the brightness distribution of the object, emits an a.c. voltage, the frequency $f$ of which is proportional to the velocity of the object image $v$ relative to the grating and to $k$. The following applies:

$$f = v \cdot k$$

This signal is superimposed (heterodyned) by longer period signals (constant light) in correspondence with the integral over the image proportions with position frequencies which do not correspond to $k$. For the suppression of this constant light proportion, a device is known with a special pair of photoelectric receivers with telescoped, strip-shaped electrodes. This device yields a push-pull signal only from image components having a position frequency corresponding to $k$, the in-phase proportions of other signals being cancelled out by a difference forming bridge circuit. The specific photoelectric receivers of this conventional arrangement again cause a high cost expenditure, due to their difficult geometry, and they limit the number of strips, since these receivers cannot be manufactured at any desired fineness. The number of strips in turn, is directly connected with the measuring accuracy of the system.

SUMMARY OF THE INVENTION

It is an object of the present invention to provide a device for the no-contact measurement of the velocity of, or distance from, objects without special optical markers with respect to a reference position, wherein in an extremely simple manner, the above-mentioned disadvantages of conventional devices are avoided. The device of the present invention is readily realized with commercially available optical and electronic components, and exhibits great flexibility with regard to the special characteristics of existing objects to be measured.

The present invention relates to a device of the type described hereinabove where the object is imaged onto a grating and the light beam leaving this grating is measured by photoelectric means. The present device is distinguished from the prior art in that a support with areal (surface-type, flat) structures photoelectrically distinguishable from one another is used as the correlator and position frequency filter and is arranged in the imaging beam path in proximity to the imaging plane of the objective. The structures of the support are disposed, in correspondence with their color, alternatingly side-by-side in line formation. The device is furthermore distinguished in that preferably two photoelectric receivers are connected after this support via at least one chromatic beam splitter. The output signals of these receivers, due to the physical configuration of the grating, are phase-shifted with respect to one another by defined amounts. In this connection, it is possible to provide structures made only in two colors and formed preferably as lines or rectangles, and the receivers then are disposed so that their output signals are in a push-pull relationship with respect to one another. Also, for the purpose of measuring in two coordinate directions, it is possible to provide structures made in more than two colors, in an alternating, line-wise arrangement.

In a further development of this idea, the colored structures are also constructed as triangles disposed in parallel to one another with their sides and in a side-byside relationship. These triangles are colored by means of four photoelectrically distinguishable colors. Respectively four differently colored triangles are joined in one point, and preferably each color is associated with a photoelectric receiver via corresponding chromatic beam splitters. A further possibility for constructing the novel device for measurement in two coordinate directions resides in that the structures are preferably constructed as rectangles in two colors and are arranged in the manner of a checkerboard, and drive means for the continuous movement of the support in one coordinate direction are provided. The chromatic beam splitters can be constituted by interference filters. Finally, the colored structures can be arranged as a rectangular pattern, wherein the rectangles of respectively alternating lines absorb the light of one color particularly strongly or particularly weakly, and the rectangles of alternating columns absorb the light of another color especially strongly or weakly, and each color is preferably associated with a photoelectric receiver via at least one corresponding chromatic beam splitter.

In many cases, it is advantageous to design the colored structures together with the associated chromatic beam splitters for measurements with infrared or ultraviolet light.

The special advantage of the present invention as compared to the prior art resides in that it is possible, in the production of signals with directional information, to use relatively simple gratings as the correlators, without the measuring accuracy being impaired thereby.

BRIEF DESCRIPTION OF THE DRAWINGS

Embodiments for the novel device are schematically illustrated in the drawings and are described hereinbelow, to wit:

FIG. 1 shows a novel device for measuring in one coordinate direction;

FIG. 1a shows a modification of the grating shown in FIG. 1 for measuring in two coordinate directions;

FIG. 2 is a special embodiment of the checkerboard-like grating of FIG. 1a;

DESCRIPTION OF THE PREFERRED EMBODIMENTS

Figure 3:
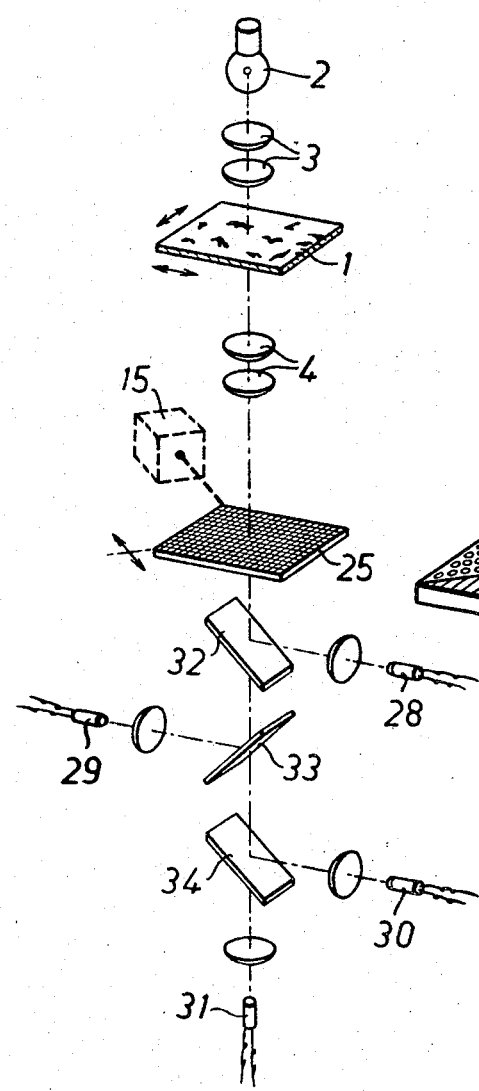
FIG. 3 is a device with a multicolored grating for measuring in two coordinate directions.

In FIG. 1, numeral 1 denotes a moving transparent object, the relative velocity of which is to be measured in transmitted light (transillumination). This object 1 is illuminated by a lamp 2 via a condenser 3. An objective 4 images the object 1 into the plane of a grating 5. This grating is formed of strips 6, 6' dyed in two photoelectrically distinguishable colors and disposed side-by-side with their longitudinal edges. Due to the fact that the grating strips exhibit alternatingly different colors, the differing coloring of proximate strips effects an energy split between image points offset with respect to one another by half a grating constant. The differently colored light proportions are separated from each other by means of a chromatic beam splitter 8 and are then fed to respectively one photoelectric receiver 10 or 11. The chromatic beam splitter 8 may be an interference filter. The grating 5 having strips 6 and 6' is commercially available and is disclosed in German Patent 639,966.

Since the structure of the object, as indicated on the object 1 by dark zones, transmits the light with different degrees of strength the output signals of the photocells 10, 11 contain variable equal (homogeneous, in-phase) proportions corresponding to the chronological change in the brightness distribution in the plane of the grating 5 due to the movement of the object 1. By the superposition of the object structure with the structure of the grating, those proportions of the image structure are filtered out, the position frequency of which corresponds to the grating constant. In this connection, additional image proportions of a lower frequency are passed through as an interfering constant light proportion. The same holds true for image points offset by half a grating constant, but with the difference that only the position frequency corresponding to the grating constant is shifted in phase by 180° with respect to the first-mentioned position (tracking) signal. By the subsequent formation of the difference between the electrical signals obtained from the two image proportions by the two receivers 10, 11, an elimination of the in-phase constant light proportions and an addition of the opposite-phase signal proportions of the filtered-out position frequency are obtained. Upon movement of the object, the position frequency is then converted, as is known, into a velocity-proportional time frequency, and measured.

It is, of course, also possible, in case of a stationary position of the object, to move the grating 5 in a defined manner relative to the optical axis of the device (drive 15, indicated in dashed lines). If this is done, for example, in one direction, with the object being stationary, a frequency is obtained at the output of the receiver which is proportional only to the moving velocity of the grating 5. In contrast thereto, when the object is moving, a frequency is obtained which, depending on the direction of motion of the object, is proportional either to the sum or to the difference of object and grating velocity. From these signals, the magnitude and direction of the movement of the object can be determined in a conventional manner by comparison with a signal derived from the movement of the grating (e.g. by means of a phase-sensitive rectifier).

If it is desired to measure the position, the number of the passed-through periods (cycles) must be counted at the output of the comparator, taking the likewise present directional information into account.

In order to obtain directional information, it is possible to insert, in a conventional manner, polarizing optical means into the beam path.

The device illustrated in FIG. 1 is also suitable for measurements in two coordinate directions, if the grating 5 is replaced by a grating as shown in FIG. 1a. As can be seen, this grating is fashioned in the manner of a checkerboard, i.e., the colored strips of the individual grating lines are offset by respectively one-half period in successive lines by lines 6'''. Such a grating is disclosed in "High Resolution Gratings" by F. Hock, in Conference on "Moire Fringe Technology" 1972, Birniehill Institute, Glasgow, England, however for the colours black and white. In order to obtain an unequivocal indication as to which signal proportions are associated with the respective coordinate directions, the grating is driven in one coordinate direction by means of drive 15. Thus, during the measuring process, two signals are obtained at each of the two receivers 10, 11, which signals differ considerably from each other with regard to their frequency. The signal of a lower frequency, resulting upon a movement of the object, yields, with its changes in amplitude, an indication of the movement of the object in one coordinate direction, while the changes in the phase position of the higher frequency signal are a measure of the movement of the object toward the other coordinate direction. The evaluation of these signals is carried out in a conventional manner as disclosed in application Ser. No. 283,967, filed Aug. 28, 1972.

FIG. 2 shows a fragment of the checkerboard grating designed for two colors. When this grating is used, the driving of the grating along one coordinate direction can be omitted. In the squares of this pattern, in a variation from the illustration of FIG. 1a, it is indicated by the insertion of the respective transmission diagrams that adjacent squares exhibit different transmissivities for the two colors. Thus, each square has a certain specific transmission (transmissivity) for each of the two colors. The rectangles of alternating lines absorb (line 20) or transmit (line 21), the light of one color particularly strongly (illustrated in dashed lines). The rectangles of alternating columns absorb (column 23) or transmit (column 22), in contrast thereto, the light of the other color (shown in full lines) particularly strongly. Therefore, in the light of one color (dashed lines), only the lines appear in rich contrast, and, in the light of the other color (full lines), only the columns appear in rich contrast. Consequently, the measuring signals of respectively one of the photoelectric receivers 10, 11 are now associated with respectively one coordinate direction. The grating of FIG. 2 is new and therefore subject of the invention. It is characterized in claim 8.

Figure 3A:
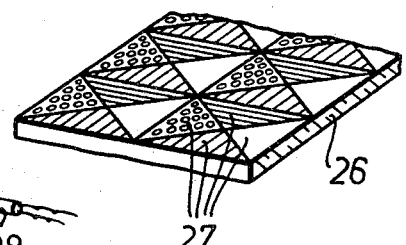
FIG. 3a is a detailed showing of the grating of FIG. 3.

FIG. 3 shows a device for measuring in two coordinate directions, wherein a multicolored grating pattern is employed. Here again, a light source 2 illuminates, via a condenser 3, a transparent object 1. This object is imaged, by means of an optical system 4, into the plane of a grating 25. FIG. 3a shows details of the subdivision of this grating. Four photoelectric receivers 28–31 are connected after the grating via chromatic splitters 32–34 and yield, upon a relative movement of the object image with respect to the grating, signals which are pairwise in push-pull relationship to one another. These signals are evaluated as disclosed in application Ser. No. 283,967 filed Aug. 28, 1972.

As can be seen, in this device, the grating 25 is likewise constructed so that rectangular structures, which are in contact with one another, are provided on a support 26. Each rectangular pattern consists of four triangular colored fields defined by the diagonals of the rectangles. Per rectangle, the pattern is colored in four colors which are distinguishable from one another photoelectrically. The arrangement of these rectangles is such that identically colored triangles have the same orientation in all rectangles. Such a grating is new and therefore subject of the invention. It is characterized in claim 7.

Thus, since the grating exhibits four different colors, the chromatic splitters 32–34 are constructed so that each one screens out respectively only one color component from the color mixture, but transmits the remaining components in an almost uninhibited manner. In this way, the photoelectric receivers 28–31 are indeed fed only with light fluxes corresponding to a specific color associated with the respective receiver.

In the devices of this invention for velocity measurement as described hereinabove, it was presupposed that the object to be measured is sharply imaged into the plane of the correlation gratings, for only in such a case do the electrical output signals of the correlators exhibit maximum amplitude. In contrast thereto, if it is intended to employ these devices according to the invention for measuring the distance with respect to objects, then the setting of the optical system imaging the object is changed until the amplitude of the output signals is at a maximum and thus the focal plane of the object image has been obtained. From this optimum adjustment, it is then possible to determine the distance from the object in a conventional manner, for example by a previous calibration of the position of the focal plane with respect to differing object distances.

As can be seen, all embodiments have been illustrated in transillumination representation, i.e., in all shown devices, the gratings are constructed to be transparent and the photoelectric receivers are, as seen in the light direction, behind the gratings. It is, of course, possible to provide, for the examples, corresponding grating systems which fulfill the functions of a reflection grating. In this case, the photoelectric receivers are disposed in front of the gratings. In place of the photoelectric receivers illustrated in the drawing, it is also possible to associate with each oppositional pair of directional coordinates a common photoelectric receiver which is alternatingly fed with the beam proportions. It is even possible, moreover, to provide in the embodiment shown in FIG. 3, only one photoelectric receiver which is fed, via an interrogator (monitor), cyclically with the beam proportions corresponding to the four coordinate directions.

The colored structures together with the associated chromatic splitter may be constructed for measurement with infrared or ultraviolet light.

We claim:

1. In an apparatus for the no-contact measurement of the velocity, the path, or the distance of an object without special optical markers with respect to a reference position having the object imaged by an objective onto a grating along an imaging beam path and measuring the light flux leaving the grating after cooperation with the grating by means of photoelectric elements generating output signals which exhibit a frequency component proportional to the velocity of movement, the improvement comprising:

a grating (5, 25) located in the imaging beam path in proximity to the imaging plane of the objective (4) defining a correlator and position frequency filter, said grating comprising a support (26) having areal, photoelectrically distinguishable, colored structures (6,6', 27), said structures disposed alternatingly in side-by-side linewise relationship in correspondence with their colors, and said support followed, via chromatic splitter means (8) by a plurality of photoelectric receivers (10, 11) generating output signals which are phase-shifted with respect to one another by given amounts based on the physical configuration of the grating.

2. The apparatus of claim 1, wherein said structures have two colors in linear arrangement (6,6') and said receivers (10, 11) are arranged with their output signals in a push-pull relationship to one another.

3. The apparatus of claim 2, wherein said structures are rectangular.

4. The apparatus of claim 3, wherein, for the purpose of measuring in two coordinate directions, said structures are rectangles (6''') in two colors in a checkerboard arrangement, and drive means (15) are provided for the continuous movement of the support in one coordinate direction.

5. The apparatus of claim 1, wherein for the purpose of measuring in two coordinate directions, said structures have more than two colors disposed in an alternating pattern in lines.

6. The apparatus of claim 1, wherein said chromatic splitter means defines an interference filter.

7. The apparatus of claim 2, wherein said colored structures are triangles (27) colored in four photoelectrically distinguishable colors and disposed with their sides in parallel to one another and in a side-by-side relationship, wherein respectively four differently colored triangles join at one point; and said chromatic splitter means are corresponding chromatic splitters (32, 33, 34), with each color associated with a photoelectric receiver (28, 29, 30, 31).

8. The apparatus of claim 1, wherein said colored structures (6,6', 27), together with said associated chromatic splitter means, are constructed for measurement with infrared light.

9. The apparatus of claim 1, wherein said colored structures (6,6', 27), together with said associated chromatic splitter means are constructed for measurement with ultraviolet light.

10. The apparatus of claim 1, for measuring in two coordinate directions, wherein said colored structures of the grating are in two colors with adjacent lines (20, 21) alternately exhibiting different transmissions for the light of one color and adjacent columns (22, 23) exhibiting different transmissions for the light of the other color; and said chromatic splitter means comprises one corresponding chromatic splitter (8), with each color associated with a photoelectric receiver.

* * * * *